United States Patent
Gunna et al.

(10) Patent No.: US 7,398,361 B2
(45) Date of Patent: Jul. 8, 2008

(54) COMBINED BUFFER FOR SNOOP, STORE MERGING, LOAD MISS, AND WRITEBACK OPERATIONS

(75) Inventors: Ramesh Gunna, San Jose, CA (US); Po-Yung Chang, Saratoga, CA (US); Sridhar P. Subramanian, Cupertino, CA (US); James B. Keller, Redwood City, CA (US); Tse-Yuh Yeh, Cupertino, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 288 days.

(21) Appl. No.: 11/215,604

(22) Filed: Aug. 30, 2005

(65) Prior Publication Data
US 2007/0050564 A1  Mar. 1, 2007

(51) Int. Cl.
*G06F 13/00* (2006.01)

(52) U.S. Cl. .................. 711/146; 711/152; 711/154; 711/210

(58) Field of Classification Search ................ 711/146, 711/152, 210, 154
See application file for complete search history.

(56) References Cited

U.S. PATENT DOCUMENTS

| | | | |
|---|---|---|---|
| 4,538,266 A | 8/1985 | Miki | |
| 5,561,780 A | 10/1996 | Glew et al. | |
| 5,630,075 A | 5/1997 | Joshi et al. | |
| 5,832,297 A | 11/1998 | Ramagopal et al. | |
| 5,893,151 A * | 4/1999 | Merchant | 711/140 |
| 6,209,068 B1 * | 3/2001 | Hill et al. | 711/159 |
| 6,334,171 B1 | 12/2001 | Hill et al. | |
| 6,366,984 B1 | 4/2002 | Carmean et al. | |
| 7,017,054 B2 * | 3/2006 | Schuckle et al. | 713/300 |
| 7,206,865 B2 * | 4/2007 | Creta et al. | 710/5 |

(Continued)

OTHER PUBLICATIONS

The Authoritative Dictionary of IEEE Standards Terms, 7th Edition, p. 217.*

(Continued)

*Primary Examiner*—Reba I Elmore
(74) *Attorney, Agent, or Firm*—Lawrence J. Merkel; Meyertons, Hood, Kivlin, Kowert & Goetzel, P.C.

(57) ABSTRACT

In one embodiment, an interface unit comprises an address buffer and a control unit coupled to the address buffer. The address buffer is configured to store addresses of processor core requests generated by a processor core and addresses of snoop requests received from an interconnect. The control unit is configured to maintain a plurality of queues, wherein at least a first queue of the plurality of queues is dedicated to snoop requests and at least a second queue of the plurality of queues is dedicated to processor core requests. Responsive to a first snoop request received by the interface unit from the interconnect, the control unit is configured to allocate a first address buffer entry of the address buffer to store the first snoop request and to store a first pointer to the first address buffer entry in the first queue. Responsive to a first processor core request received by the interface unit from the processor core, the control unit is configured to allocate a second address buffer entry of the address buffer to store the first processor core request and to store a second pointer to the second address buffer entry in the second queue.

17 Claims, 11 Drawing Sheets

U.S. PATENT DOCUMENTS

2002/0147889 A1* 10/2002 Kruckemyer et al. ....... 711/144
2003/0065843 A1* 4/2003 Jones et al. ................. 710/107
2006/0179244 A1* 8/2006 Goodman et al. ........... 711/141
2006/0259707 A1* 11/2006 Freytag ...................... 711/146
2006/0282622 A1* 12/2006 Sistla et al. ................. 711/146

OTHER PUBLICATIONS

Microsoft Press Computer Dictionary, 3rd Edition.*
P.A. Semi, "The PWRficient Processor Family," pp. 1-31, Oct. 2005.

* cited by examiner

COMBINED BUFFER FOR SNOOP, STORE MERGING, LOAD MISS, AND WRITEBACK OPERATIONS

BACKGROUND

1. Field of the Invention

This invention is related to the field of processors and, more particularly, to interfacing processors with other components in a system.

2. Description of the Related Art

Processors are typically included in systems with other components and are configured to communicate with the other components via an interconnect on which the processor is designed to communicate. The other components may be directly connected to the interconnect, or may be indirectly connected through other components. For example, many systems include an input/output (I/O) bridge connecting I/O components to the interface.

Typically, the processor includes an interface unit designed to communicate on the interconnect on behalf of the processor core. The processor core generates requests to be transmitted on the interconnect, such as read and write requests to satisfy load and store operations and instruction fetch requests. Additionally, most processors implement caches to store recently fetched instructions/data, and implement cache coherency to ensure coherent access by processors and other components even though cached (and possible modified) copies of blocks of memory exist. Such processors receive coherency related requests from the interconnect (e.g. snoop requests to determine the state of a cache block and to cause a change in state of the cache block).

The interface unit generally implements various customized buffers for different requests that may be generated by the processor core and received from the interconnect. For example, incoming snoop buffers, read request buffers for load misses, write buffers for uncacheable writes, and writeback buffers for writes of evicted cache lines are commonly implemented. Each set of buffers is separate and is designed to store customized information for the corresponding request. The customized buffers may consume large amounts of floor plan space. Additionally, since the buffers are dedicated to different request types, the number of each type of buffer is carefully selected to provide the desired level of performance. Furthermore, at times when a particular request type is prevalent, buffers for other request types may go unused while the prevalent request type is stalled waiting on buffers for that request type to free via completion of earlier requests.

SUMMARY

In one embodiment, an interface unit is configured to interface a processor core to an interconnect. The interface unit comprises an address buffer and a control unit coupled to the address buffer. The address buffer comprises a plurality of address buffer entries. The address buffer is configured to store addresses of processor core requests generated by the processor core and addresses of snoop requests received from the interconnect. The control unit is configured to maintain a plurality of queues, wherein at least a first queue of the plurality of queues is dedicated to snoop requests and at least a second queue of the plurality of queues is dedicated to processor core requests. Responsive to a first snoop request received by the interface unit from the interconnect, the control unit is configured to allocate a first address buffer entry of the plurality of address buffer entries to store the first snoop request and to store a first pointer to the first address buffer entry in the first queue. Responsive to a first processor core request received by the interface unit from the processor core, the control unit is configured to allocate a second address buffer entry of the plurality of address buffer entries to store the first processor core request and to store a second pointer to the second address buffer entry in the second queue.

In another embodiment, a method comprises maintaining a plurality of queues, wherein at least a first queue of the plurality of queues is dedicated to snoop requests and at least a second queue of the plurality of queues is dedicated to processor core requests; responsive to a first snoop request received from an interconnect, allocating a first address buffer entry of a plurality of address buffer entries comprised in an address buffer; storing a first pointer to the first address buffer entry in the first queue; responsive to a first processor core request received from a processor core, allocating a second address buffer entry of the plurality of address buffer entries to store the first processor core request; and storing a second pointer to the second address buffer entry in the second queue.

BRIEF DESCRIPTION OF THE DRAWINGS

The following detailed description makes reference to the accompanying drawings, which are now briefly described.

Figure 1:
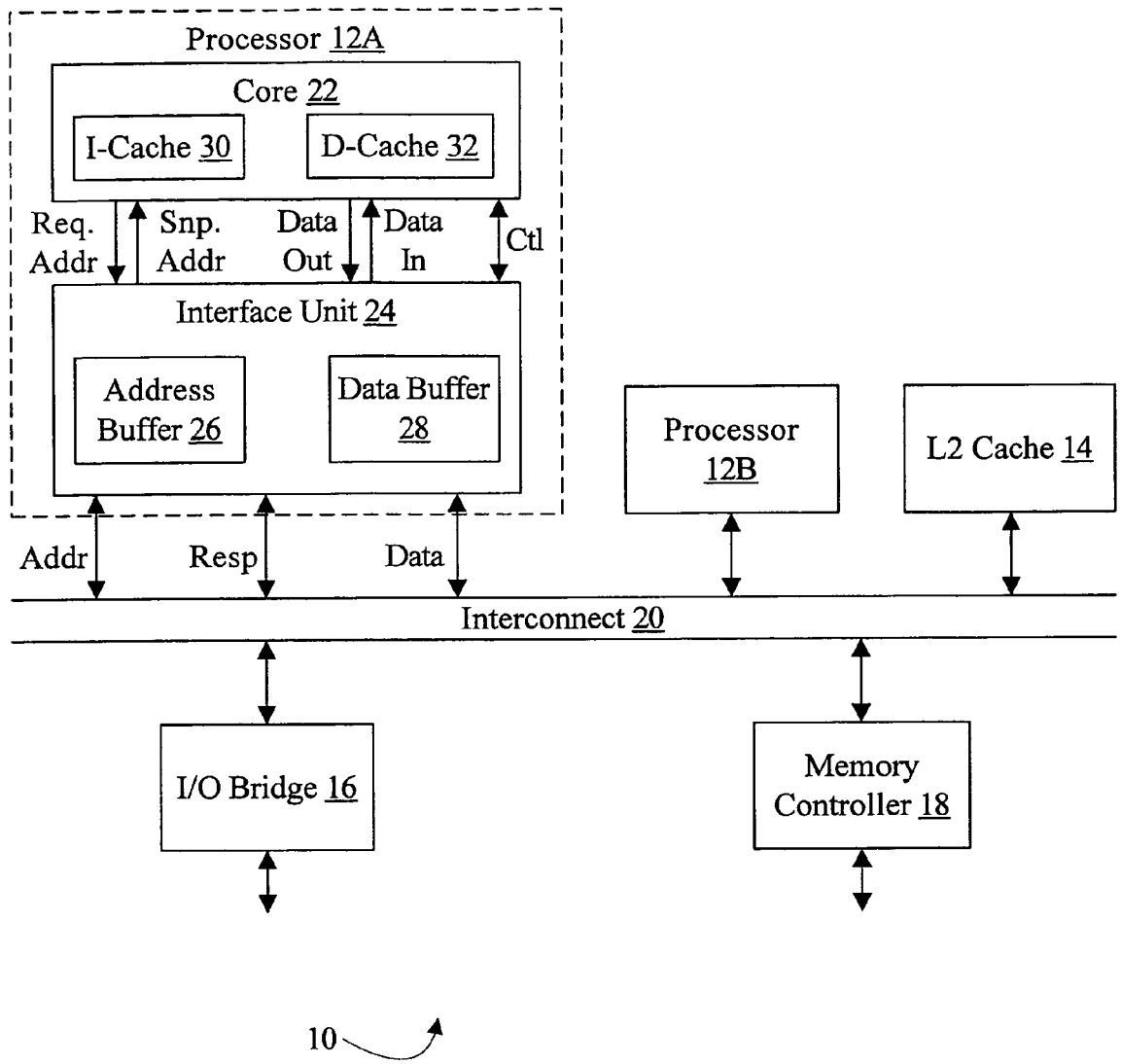
FIG. 1 is a block diagram of one embodiment of a system including one or more processors that include a processor core and an interface unit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 includes processors 12A-12B, a level 2 (L2) cache 14, an I/O bridge 16, a memory controller 18, and an interconnect 20. The processors 12A-12B, the L2 cache 14, the I/O bridge 16, and the memory controller 18 are coupled to the interconnect 20. While the illustrated embodiment includes two processors 12A-12B, other embodiments of the system 10 may include one processor or more than two processors. Similarly, other embodiments may include more than one L2 cache 14, more than one I/O bridge 16, and/or more than one memory controller 18. In one embodiment, the system 10 may be integrated onto a single integrated circuit chip. In other embodiments, the system 10 may comprise two or more integrated circuit components coupled together via a circuit board. Any level of integration may be implemented in various embodiments.

The processor 12A is shown in greater detail in FIG. 1. The processor 12B may be similar. In the illustrated embodiment, the processor core 12A includes a processor core 22 (more briefly referred to herein as a "core") and an interface unit 24. The interface unit 24 includes an address buffer 26 and a data buffer 28. The interface unit 24 is coupled to receive a request address and provide a snoop address to the core 22 (Req. Addr and Snp. Addr in FIG. 1, respectively). Additionally, the interface unit 24 is coupled to receive data out and provide data in to the core 22 (Data Out and Data In in FIG. 1, respectively). Additional control signals (Ctl) may also be provided between the core 22 and the interface unit 24. The interface unit 24 is also coupled to communicate address, response, and data phases of transactions on the interconnect 20.

The core 22 generally includes the circuitry that implements instruction processing in the processor 12A, according to the instruction set architecture implemented by the processor 12A. That is, the core 22 may include the circuitry that fetches, decodes, executes, and writes results of the instructions in the instruction set. The core 22 may include one or more caches (e.g. an instruction cache 30 and a data cache 32). In one embodiment, the processors 12A-12B implement the PowerPC™ instruction set architecture. However, other embodiments may implement any instruction set architecture (e.g. MIPS™, SPARC™, x86 (also known as Intel Architecture-32, or IA-32), IA-64, ARM™, etc.).

The interface unit 24 includes the circuitry for interfacing between the core 22 and other components coupled to the interconnect 20, such as the processor 12B, the L2 cache 14, the I/O bridge 16, and the memory controller 18. In the illustrated embodiment, cache coherent communication is supported on the interconnect 20 via the address, response, and data phases of transactions on the interconnect 20. Generally, a transaction is initiated by transmitting the address of the transaction in an address phase, along with a command indicating which transaction is being initiated and various other control information. Cache coherent agents on the interconnect 20 use the response phase to maintain cache coherency. Each coherent agent responds with an indication of the state of the cache block addressed by the address, and may also retry transactions for which a coherent response cannot be determined. Retried transactions are cancelled, and may be reattempted later by the initiating agent. The order of successful (non-retried) address phases on the interconnect 20 may establish the order of transactions for coherency purposes. The data for a transaction is transmitted in the data phase. Some transactions may not include a data phase. For example, some transactions may be used solely to establish a change in the coherency state of a cached block. Generally, the coherency state for a cache block may define the permissible operations that the caching agent may perform on the cache block (e.g. reads, writes, etc.). Common coherency state schemes include the modified, exclusive, shared, invalid (MESI) scheme, the MOESI scheme which includes an owned state in addition to the MESI states, and variations on these schemes.

The interconnect 20 may have any structure. For example, the interconnect 20 may have separate address, response, and data interfaces to permit split transactions on the interconnect 20. The interconnect 20 may support separate address and data arbitration among the agents, permitting data phases of transactions to occur out of order with respect to the corresponding address phases. Other embodiments may have in-order data phases with respect to the corresponding address phase. In one implementation, the address phase may comprise an address packet that includes the address, command, and other control information. The address packet may be transmitted in one bus clock cycle, in one embodiment. In one particular implementation, the address interconnect may include a centralized arbiter/address switch to which each source agent (e.g. processors 12A-12B, L2 cache 14, and I/O bridge 16) may transmit address requests. The arbiter/address switch may arbitrate among the requests and drive the arbitration winner onto the address interconnect. In one implementation, the data interconnect may comprise a limited crossbar in which data bus segments are selectively coupled to drive the data from data source to data sink.

The core 22 may generate various requests. Generally, a core request may comprise any communication request generated by the core 22 for transmission as a transaction on the interconnect 20. Core requests may be generated, e.g., for load/store instructions that miss in the data cache 32 (to retrieve the missing cache block from memory), for fetch requests that miss in the instruction cache 30 (to retrieve the missing cache block from memory), non-cacheable load/store requests, writebacks of cache blocks that have been evicted from the data cache 32, etc. The interface unit 24 may receive the request address and other request information from the core 22, and corresponding request data for write requests (Data Out). For read requests, the interface unit 24 may supply the data (Data In) in response to receiving the data from the interconnect 20.

The interface unit 24 may also receive snoop requests from the interconnect 20. In general, a snoop request may be any request generated responsive to a transaction performed on the interconnect 20, to maintain cache coherency. The address phase of a transaction generated by another agent that is performed as a cache coherent transaction may be received as a snoop request. Dependent on the type of transaction being performed and the desired cache state for the initiator of the transaction, various cache state changes may be required in the processor 12A. Additionally, if the processor 12A is caching a modified copy of the cache block addressed by the transaction (or an owned copy of the cache block, if the coherency state scheme includes an owned state), the processor 12A may be required to provide the copy as the data phase of the transaction. Some transactions may be defined to cause state changes only (e.g. a transaction from an agent indicating that it is attempting to change the state of the cache block to modified in that agent, a transaction requesting a change to shared, etc.). In some implementations, specialized probe commands may be supported on the interconnect 20 to determine the state of the cache block in a receiving agent. Such probe commands may also be a type of snoop request.

The interface unit 24 includes an address buffer 26 configured to store addresses of requests and a data buffer 28 configured to store data corresponding to the request. The address buffer 26 may be a unified buffer comprising address buffer entries that may be used to store addresses of core requests and addresses of snoop requests. Similarly, the data buffer 28 may be a unified buffer comprising data buffer entries that may be used to store data corresponding to core requests and data corresponding to snoop requests. Entries in the address buffer 26 and data buffer 28 may be dynamically allocated to requests as needed. In some embodiments, if a relatively large number of the same type of request occur in a short period of time, the requests may be permitted to occupy most of the entries in the address buffer 26 and data buffer 28. Thus, the buffers may dynamically accommodate different mixes of request traffic and still provide high buffer utilization. Furthermore, in some embodiments, the unified structure may be compact in terms of floor space in an integrated circuit.

In one embodiment, the address buffer 26 and data buffer 28 may be used as a store merge buffer. Cacheable stores (whether a cache hit or a cache miss) may be written to the address buffer 26 and data buffer 28. Additional cacheable stores to the same cache block may be merged into the address buffer entry/data buffer entry. Subsequently, the modified cache block may be written to the data cache 32. Such operation may, in some embodiments, simplify operation of the data cache 32 by avoiding a read-modify-write sequence for stores to cache blocks in the data cache 32. Non-cacheable stores may also be merged in the address buffer 26 and data buffer 28. The result of the merged stores may be performed on the interconnect 20 as a single transaction, reducing bandwidth on the interconnect 20.

The L2 cache 14 may be an external level 2 cache, where the data cache 32 and the instruction cache 30 are level 1 (L1) caches. In one implementation, the L2 cache 14 may be a victim cache for cache blocks evicted from the L1 caches. The L2 cache 14 may have any construction (e.g. direct mapped, set associative, etc.).

The I/O bridge 16 may be a bridge to various I/O devices or interfaces (not shown in FIG. 1). Generally, the I/O bridge 16 may be configured to receive transactions from the I/O devices or interfaces and to generate corresponding transactions on the interconnect 20. Similarly, the I/O bridge 16 may receive transactions on the interconnect 20 that are to be delivered to the I/O devices or interfaces, and may generate corresponding transactions to the I/O device/interface. In some embodiments, the I/O bridge 16 may also include direct memory access (DMA) functionality.

The memory controller 18 may be configured to manage a main memory system (not shown in FIG. 1). The memory in the main memory system may comprise any desired type of memory. For example, various types of dynamic random access memory (DRAM) such as synchronous DRAM (SDRAM), double data rate (DDR) SDRAM, etc. may form the main memory system. The processors 12A-12B may generally fetch instructions from the main memory system, and may operate on data stored in the main memory system. I/O devices may use the main memory system to communicate with the processors 12A-12B (e.g. via DMA operations or individual read/write transactions).

Figure 2:
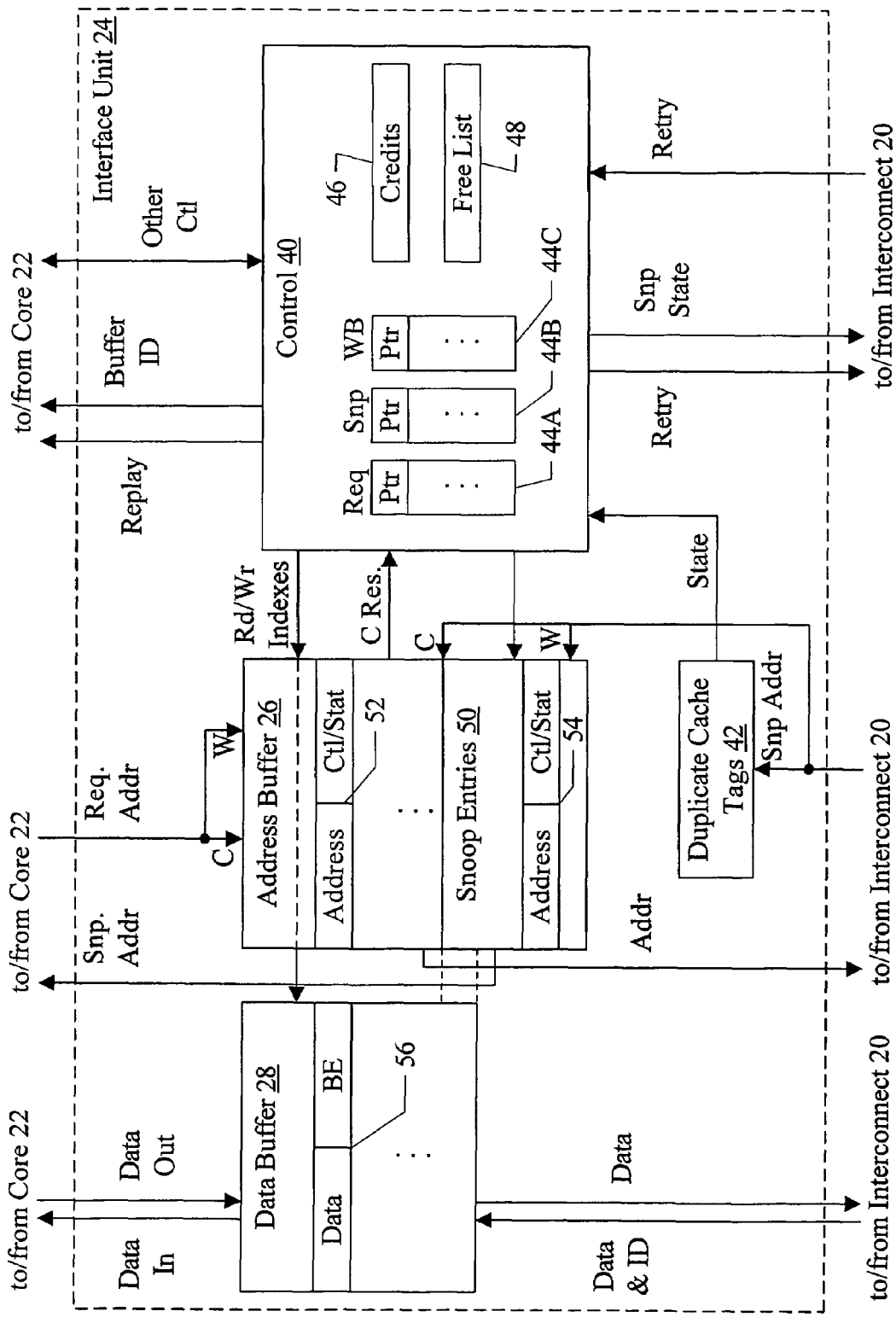
FIG. 2 is a block diagram of one embodiment of an interface unit.

Turning now to FIG. 2, a block diagram of one embodiment interface unit 24 is shown. In the illustrated embodiment, the interface unit 24 includes the data buffer 28 and the address buffer 26. Additionally, the interface unit 24 includes a control unit 40 and a duplicate cache tags 42. The control unit 40 is coupled to the address buffer 26, the data buffer 28, the duplicate cache tags 42, and various control signals to the core 22. Additionally, the control unit 40 is coupled to various signals from the interconnect 20, including some of the response phase signals.

Specifically, the data buffer is coupled to the Data in and Data Out interface to/from the core 22 and is also coupled to receive/supply data for the data phases on the interconnect 22. The data buffer 28 is coupled to receive read/write indexes from the control unit 40. The address buffer 26 is coupled to supply a snoop address to the core 22 and receive a core request address from the core 22. The address buffer is coupled to receive the snoop address of snoop request from the interconnect 20, and to supply an address to the interconnect 20. The duplicate cache tags 42 are coupled to receive the snoop address, and to provide a corresponding cache state to the control unit 40. The control unit 40 is coupled to provide read/write indexes to the address buffer 26, and to receive comparison results (C Res. in FIG. 2) from the address buffer 26. The comparison results are the result of comparing the contents of address buffer entries to the core request address and the snoop address (via compare ports marked "C" in FIG. 2). The core request address and the snoop address are also coupled to write ports on the address buffer 26 (marked "W" in FIG. 2). The snoop address to the core 22 and the address supplied to the interconnect 20 may be output from one or more read ports of the address buffer 26.

The control unit 40 includes a set of queues 44A-44C. The queues 44A-44C may comprise any type of memory, and may store pointers into the address buffer 26/data buffer 28. In one embodiment, each data buffer entry has a one-to-one correspondence with an address buffer entry, and thus a single pointer may be stored for each request in the queues 44A-44C. The pointer may identify the address buffer entry and the corresponding data buffer entry (if applicable). Other embodiments may allocate address buffer entries and data buffer entries independently. In such embodiments, the address buffer entry may store a pointer to the data buffer entry assigned to the request stored in that address buffer entry, or two pointers may be included in the queues 44A-44C (one for the address buffer entry and one for the data buffer entry). The pointers may be used as the read/write indexes into the address buffer 26 and the data buffer 28 to read/write information in the address buffer 26 and the data buffer 28 as the requests are processed.

Each of the queues 44A-44C may be operated as a first-in, first-out (FIFO) queue. Each queue 44A-44C may be dedicated to requests of a given type, and may provide an order for the requests of that type. Thus, requests may be dynamically allocated into any free entry in the buffers 26 and 28 as they arrive, and the queues 44A-44C may retain the order of requests. In the illustrated embodiment, core requests other than writebacks may be queued in the queue 44A, snoop requests may be queued in the queue 44B, and writebacks may be queued in the queue 44C. Instruction cache fills (for fetches that miss in the instruction cache 30) may be stored in a separate instruction fetch queue (not shown), or may be included in the request queue 44A. In some embodiments, while the queues 44A-44C may generally operation in a FIFO manner, requests within a queue may be issued out of order based on various criteria.

To flow control the address buffer entries/data buffer entries among different requests, the control unit 40 may implement a credit system recorded in the credits 46. Each request type may be allocated a certain number of credits (where each credit represents one address buffer entry and corresponding data buffer entry, if applicable). The total number of credits may not exceed the total number of entries. When a buffer entry is allocated to a request, a credit is consumed and when the buffer entry is freed via completion of a request, the credit is returned. In one embodiment, the credits 46 include request credits corresponding to the request queue and snoop credits for snoop requests. Writeback requests may reuse the buffer entry used for the request that causes the writeback, in one embodiment, and thus may not require separate credits. Other embodiments may manage the writeback requests separately and may include separate writeback credits. The number of credits provided as request credits, writeback credits, and snoop credits may be varied over time, in some embodiments, to adjust the credits (and thus buffer entries that may be consumed by various requests) to the mix of traffic being received by the interface unit 24. In one implementation, at least one snoop credit may be provided at all times. Additional snoop credits may be provided in the illustrated embodiment for dedicated snoop entries in the address buffer 26 that do not have corresponding data buffer entries, described in more detail below.

As mentioned above, the order of requests of each type may be kept in the queues 44A-44C, and thus buffer entries may be allocated without regard to the order of the requests stored in the buffer entries. Additionally, various requests may complete out of order with respect to the order in which they were initiated. Accordingly, buffer entries may free in any order. The control unit 40 may maintain a free list 48 of buffer entries that are available for allocation (buffer entries that are not in use). If a buffer entry is to be allocated, the control unit 40 may use the free list 48 to select the buffer entry. For example, the free list 48 may comprise a bit vector, with each bit corresponding to a buffer entry. If the bit is set, the buffer entry is available and if the bit is clear, the buffer entry is not available (or vice versa).

In the illustrated embodiment, the number of address buffer entries in the address buffer 26 may exceed that number of data buffer entries in the data buffer 28. In the present embodiment, there is a one-to-one correspondence of data buffer entries to address buffer entries. Accordingly, some of the address buffer entries do not have corresponding data buffer entries. These address buffer entries, along with one address buffer entry that does have a corresponding data buffer entry, may be dedicated to storing snoop requests (shown in FIG. 2 as snoop entries 50). The snoop entries 50 are part of the address buffer 26, and thus may have the same amount of storage in each entry as the other address buffer entries. The snoop entries 50 may store the same information as the other address buffer entries and may be built in the same physical memory structure with the other address buffer entries. For example, exemplary entries 52 and 54 are shown in the address buffer 26. Each entry 52 and 54 includes the address of the request and may include control/status information. The control/status information may include the command for the address phase, a transaction identifier (ID) that identifies the transaction on the interconnect 20, and various other status bits that may be updated as the transaction corresponding to a request is processed toward completion.

An exemplary data buffer entry 56 is illustrated in FIG. 2 as well. The data buffer entry may include data (e.g. a cache block in size, in one embodiment) and a set of byte enables (BE). There may be a BE bit for each byte in the cache block. In one embodiment, a cache block may be 64 bytes and thus there may be 64 BE bits. Other embodiments may implement cache blocks larger or smaller than 64 bytes (e.g. 32 bytes, 16 bytes, 64 bytes, etc.) and a corresponding number of BE bits may be provided. The BE bits may be used for store merging, in some embodiments, and may also record which bytes are valid in the data buffer entry 56. For example, in one embodiment, a cache block of data may be transferred over multiple clock cycles on the interconnect 20. For example, 16 bytes of data may be transferred per clock cycle for a total of 4 clock cycles of data transfer on the interconnect 20 for a 64 byte block. Similarly, in some embodiments, multiple clock cycles of data transfer may occur on the Data Out/Data In interface to the core 22. For example, 16 bytes may be transferred per clock between the core 22 and the interface unit 24. The BE bits may record which bytes have been provided in each data transfer.

As mentioned previously, the snoop entries 50 include one address buffer entry that does have a corresponding data buffer entry (illustrated as the dashed lines between the snoop entries 50 and the data buffer 28). Other embodiments may include more than one address buffer entry that has a corresponding data buffer entry, as desired. The data buffer entry may be used to store data that is to be supplied on the interconnect 20 to complete a snoop request. While the snoop response may be provided in a fixed time window from transmission of the address phase, the data phase may occur at any time at the discretion of the data source. For a snoop transaction for which the processor 12A is to return a cache block, the processor 12A is the data source. Accordingly, the snoop requests that require data from the processor 12A may be processed one at a time, using the data buffer entry that is dedicated to snoop requests. In one embodiment, the snoop requests are not shifted in the snoop entries 50. Rather, the snoop entries 50 may share the data buffer entry. At any given time, the oldest snoop request (as indicated by the snoop queue 44B) may use the data buffer entry to store data corresponding to that snoop request.

The duplicate cache tags 42 may duplicate the cache tags of the data cache 32 for snoop request look up. The duplicate cache tags 42 may thus mirror the state of the cache tags in the data cache 32 in general, although there may be a time lag in the update of the duplicate cache tags 42 (as compared to the data cache tags) as long as the correct state of a given block is located in the duplicate cache tags 42 for a given snoop request. The duplicate cache tags 42 may store the address of each cache block in the data cache 32 (less the address bits that define the offset within a cache block) along with the cache state of that cache block according to the implemented cache coherency state scheme. The snoop address may be input to the duplicate cache tags 42, and the corresponding coherency state may be provided to the control unit 40. The control unit 40 may use the state to form an appropriate snoop state (Snp State in FIG. 2) to provide on the interconnect 20 during the response phase of the snoop transaction.

By looking up the snoop address in the duplicate cache tags 42 on receipt, the control unit 40 may provide a snoop state in the response phase of the snoop transaction. Additionally, the control unit 40 may determine, from the state provided by the duplicate cache tags 42, whether or not additional action is to be taken in the processor 12A to complete the snoop request. For example, the additional action may include changing the state of the cache block in the data cache 32. The additional action may include reading the cache block from the data cache 32 and providing the data in the data phase of the snoop request. If no additional action is to be taken, the control unit 40 may avoid retrying the snoop request even if there are no snoop buffers 50 available to store the snoop request. The control unit 40 may retry the snoop request (e.g. by asserting a retry signal in the response phase of the snoop transaction) if additional action is to be taken and there is no snoop buffer 50 available.

In some cases, a snoop request may be retried even if the state from the duplicate cache tags 42 doesn't indicate that additional action is to be taken. Particularly, the snoop address is provided to a compare port on the address buffer 26 and is compared to the address in the address buffer 26 (except for the snoop entries 50). If the snoop address matches, on a cache block granularity, an address in the address buffer 26, a retry is sometimes generated. For example, if the request corresponding to the matching address in the address buffer 26 has successfully completed the address phase of a transaction on the interconnect 20, the request has been ordered ahead of the snoop request. However, the request is not yet complete, as it is still in the address buffer 26. In such cases, the control unit 40 may retry the snoop request.

If additional action is to be taken for a snoop request and the snoop transaction is not being retried, the control unit 40 may allocate a snoop entry 50 to the snoop request, update the free list 48 to reflect the allocated entry, update the credits 46 to reflect consumption of the entry, and update the snoop queue 44B with a pointer to the allocated entry. The snoop address is provided to a write port on the address buffer 26 and is written to the allocated entry, using the pointer as a write index to the address buffer 26 to identify the allocated entry. In some embodiments, the control unit 40 may also be configured to assert the replay signal to the core 22 to replay any speculative operations to the snooped cache block.

A compare of the request address for a core request to the address buffer entries in the address buffer 26 (including the snoop entries 50) may also be performed. The control unit 40 may use the replay control signal to the core 22 to replay a request for which a match occurs, in some cases. The assertion of the replay control signal may cause the core 22 to cancel the operation that generated the request (e.g. the instruction that generated the request or the load/store unit operation that generated the request) and reattempt the operation again at a later time. In some cases, the control unit 40 may supply a buffer ID to the core 22 indicating the address buffer entry on which the match was detected. The buffer ID may be matched to a buffer ID provided by the interface unit 24 when the request in that address buffer entry completes, and may be used as a trigger to reattempt the replayed request. In other cases, a match may not cause a replay. For example, store merging may be detected for a store request that matches a store request in the queue, and the store data may be merged into the matching entry.

If a request is not replayed, the request address is written to the allocated address buffer entry (using the pointer as a write index, via the write port to which the request address is coupled). The corresponding queue 44A or 44C may be updated with the pointer to the allocated entry, the free list 48 may be updated to reflect allocation of the entry, and the credits 46 may be updated to reflect consumption of the entry.

Requests that have been written to the address buffer 26 are subsequently read from the address buffer 26 (and corresponding data written to the data buffer 28 is subsequently read from the data buffer 28). The control unit 40 may generally read pointers from the queues 44A-44C to provide as read indexes to the address buffer 26, e.g. to provide a snoop address to the core 22 or to provide a request address to the interconnect 20. Similarly, the pointers may be used as a read/write index to the data buffer 28. In one embodiment, the data provided from the interconnect 20 may also include a transaction ID (ID in FIG. 2) that includes the index into the data buffer 28. That is, the transaction ID used by the interface unit 24 on the interconnect 20 may include within it the pointer to the buffer entry in the address buffer 26/data buffer 28 that stores the request (along with a value identifying the processor 12A and any other desired transaction ID data). The transaction ID may be used as an index into the data buffer 28 to write data received from the interconnect 20.

Once a request has completed and the corresponding buffer entry may be freed, the control unit 40 may update the free list 48 to indicate that the entry is free and update the credits 46 to return the credit for the corresponding request type. The operation of the interface unit 24 for various request types is described in more detail below with respect to FIGS. 3-11.

It is noted that, while the present embodiment dedicates certain address buffer entries as snoop entries, other embodiments may allocate any address buffer entries as snoop entries, intermixed with other entries.

The buffers 26 and 28 may comprise any type of memory. For example, the buffers 26 and 28 may comprise random access memory (RAM) arrays, clocked storage devices such as flops, registers, latches, etc., or any combination thereof. In one embodiment, at least the portion of the address buffer 26 that stores address bits may be implemented as a content addressable memory (CAM) for comparing addresses on the compare ports shown in FIG. 2 to generate the comparison results provided to the control unit 40. In the present discussion, the term buffer entry may be used generically to refer to the address buffer entry and its corresponding data buffer entry, if any.

FIGS. 3-11 will next be described to illustrate additional details of various requests and the operation of one embodiment of the interface unit 24 for such requests. In each FIG. 3-11, the blocks are illustrated in a particular order for ease of understanding. However, other orders may be used. Furthermore, blocks may be performed in parallel in combinatorial logic in the interface unit 24. Blocks, combinations of blocks, or a flowchart as a whole may be pipelined over multiple clock cycles in various embodiments.

Figure 3:
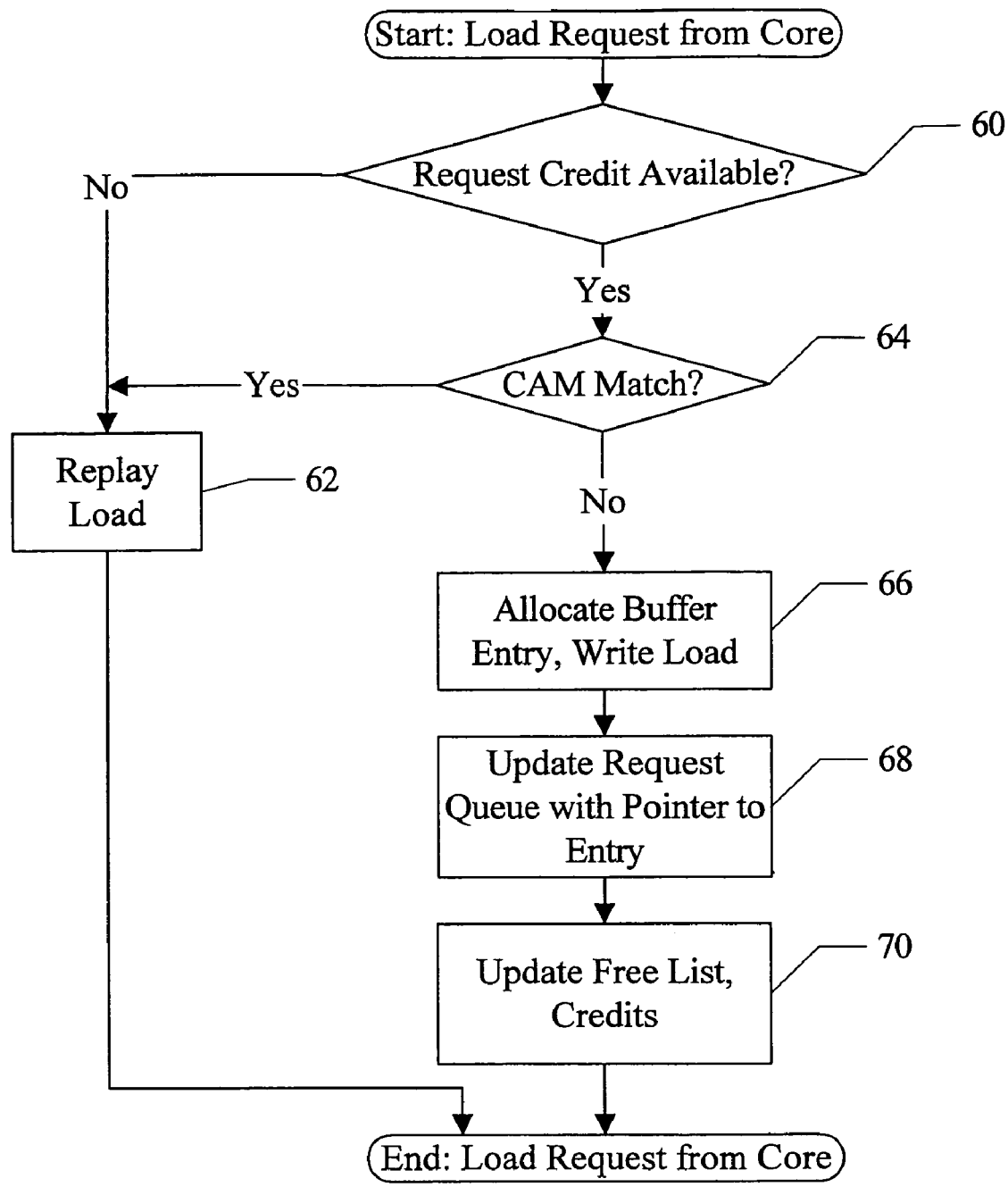
FIG. 3 is a flowchart illustrating operation of one embodiment of the interface unit in response to a load request issued by the processor core.

Turning now to FIG. 3, a flowchart is shown illustrating operation of one embodiment of the interface unit 24 in response to a load request from the core 22. The load request may be the result of a load operation that missed in the data cache 32, or may be a non-cacheable load operation.

The control unit 40 may determine if a request credit is available to allocate for the load request (that is, a credit corresponding to the request queue 44A). If a request credit is not available (decision block 60, "no" leg), the control unit 40 may assert the replay signal to replay the load request (block 62). If the load address matches an address in the address buffer 26 (decision block 64, "yes" leg), the control unit 40 may also replay the load request (block 62). In this case, the control unit 40 may also provide the buffer ID of the address buffer entry that matched the load address to the core 22.

If the load request is not replayed, the control unit 40 may allocate an address buffer entry from the free list 48, and may write the load request to the allocated address buffer entry. The control unit 40 may provide the pointer to the allocated entry as a write index to the address buffer 26 to write the load request into the address buffer 26 (block 66). The load request is queued in the request queue 44A in this embodiment, so the control unit 40 updates the request queue 44A with the pointer to the allocated entry (block 68). The control unit 40 may update the free list 48 to indicate that the allocated buffer entry is not free, and may update the credits 46 to reflect consumption of a credit by the load request (e.g. by decrementing the request credit count—block 70).

In some embodiments, cacheable load requests that hit in the data cache 32 may also be presented to the address buffer 26 for comparison purposes, for possible replay. For example, such load requests may be replayed if a snoop request to the cache block is in the address buffer 26 or if a preceding store request that updates the cache block is in the address buffer 26. In one embodiment, a cacheable load request that hits in the data cache 32 and that also hits a store merge buffer entry may be replayed only if the load accesses one or more bytes that are updated by the merged stores. That is, if the load request reads bytes that are not updated by the merged stores, the bytes may be provided by the data cache 32 and the load request may be permitted to complete.

Figure 4:
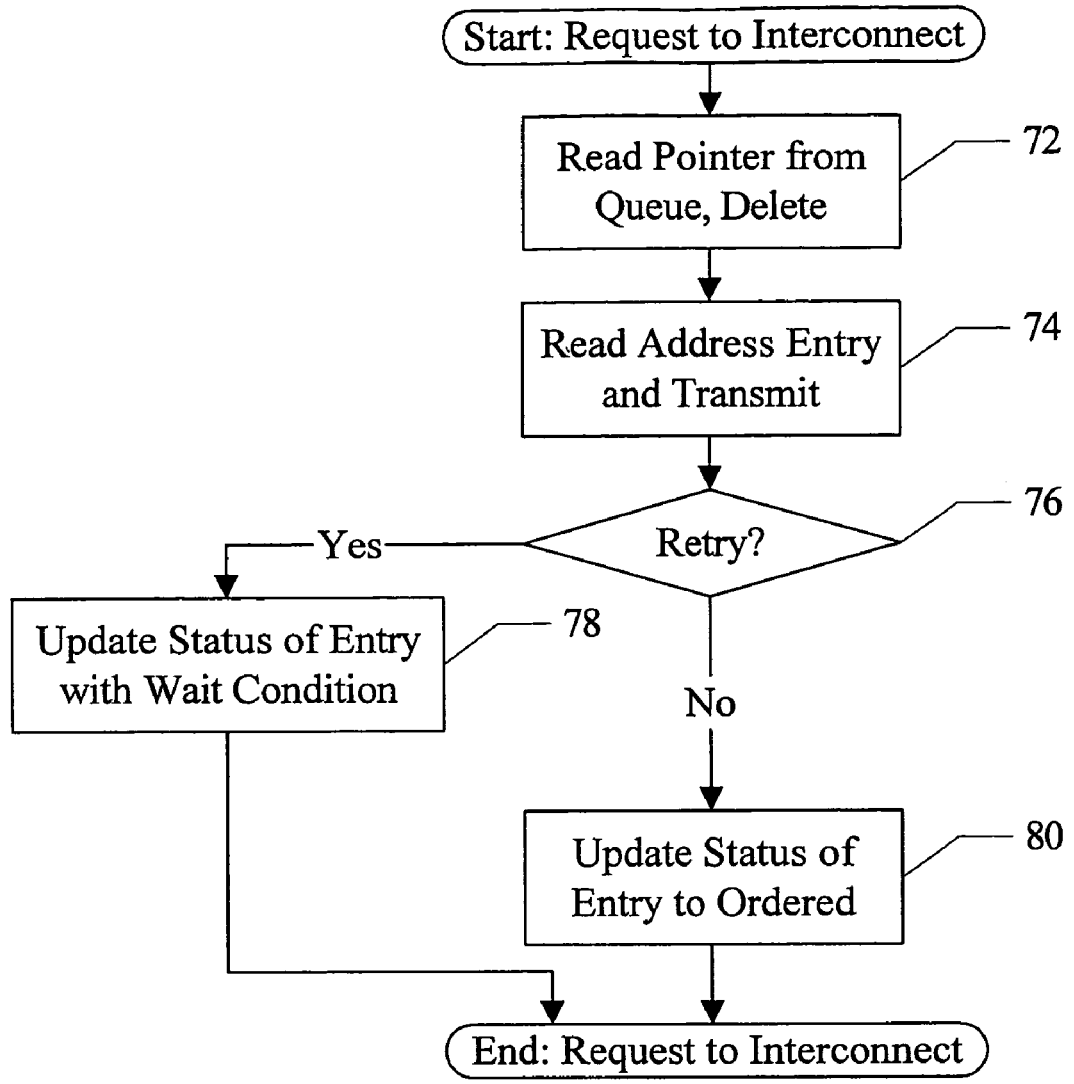
FIG. 4 is a flowchart illustrating operation of one embodiment of the interface unit to transmit a request on the interconnect.

FIG. 4 is a flowchart illustrating generally the transmission of a core request onto the interconnect 20 for one embodiment of the interface unit 24. For example, the load request written to the address buffer 26 as illustrated in FIG. 3 may be transmitted as illustrated in FIG. 4.

The control unit 40 may arbitrate among the requests queued in the queues 44A and 44C to select a request for transmission. Any arbitration scheme may be used (e.g. priority, round-robin, weighted round-robin based on priority, etc.). The control unit 40 may read the pointer corresponding to the selected request from the queue 44A or 44C (block 72) and use the pointer to read the address buffer entry from the address buffer 26 for transmission on the interconnect 20 (block 74). The control unit 40 may also delete the pointer from the queue 44A or 44C (block 72). As mentioned previously, in one embodiment, the address phase of the interconnect 20 is controlled by a centralized arbiter/address switch to which the processor 12A transmits address requests. In such an embodiment, the control unit 40 may read the pointer and use the pointer to read the address buffer entry if a queue entry in the arbiter/address switch is available for the processor 12A to store a request. In other embodiments, the control unit 40 may read the pointer and use the pointer to read the address buffer entry in response to winning an address phase arbitration.

The control unit 40 may detect that the address phase of the request has been transmitted, and may check for a retry during the response phase of the transaction. If the transaction is retried (decision block 76, "yes" leg), the retrying agent may provide an indication of a wait condition for which the request should wait before being reattempted. For example, a transaction ID of an outstanding transaction that is to be completed before the transaction is reattempted may be supplied. The control unit 40 may capture the wait condition and monitor for the wait condition to occur before reattempting that transaction (block 78). Once the wait condition has cleared, the control unit 40 may requeue the pointer to the entry in the corresponding queue 44A or 44C. If no wait condition is supplied, the control unit 40 may requeue the pointer in the corresponding queue 44A or 44C immediately. If the transaction is not retried (decision block 76, "no" leg), the address phase of the request has been successfully completed and therefore the request has been ordered (for coherency purposes). The control unit 40 may update the status of the address buffer entry to indicate that the request has been ordered (block 80).

Figure 5:
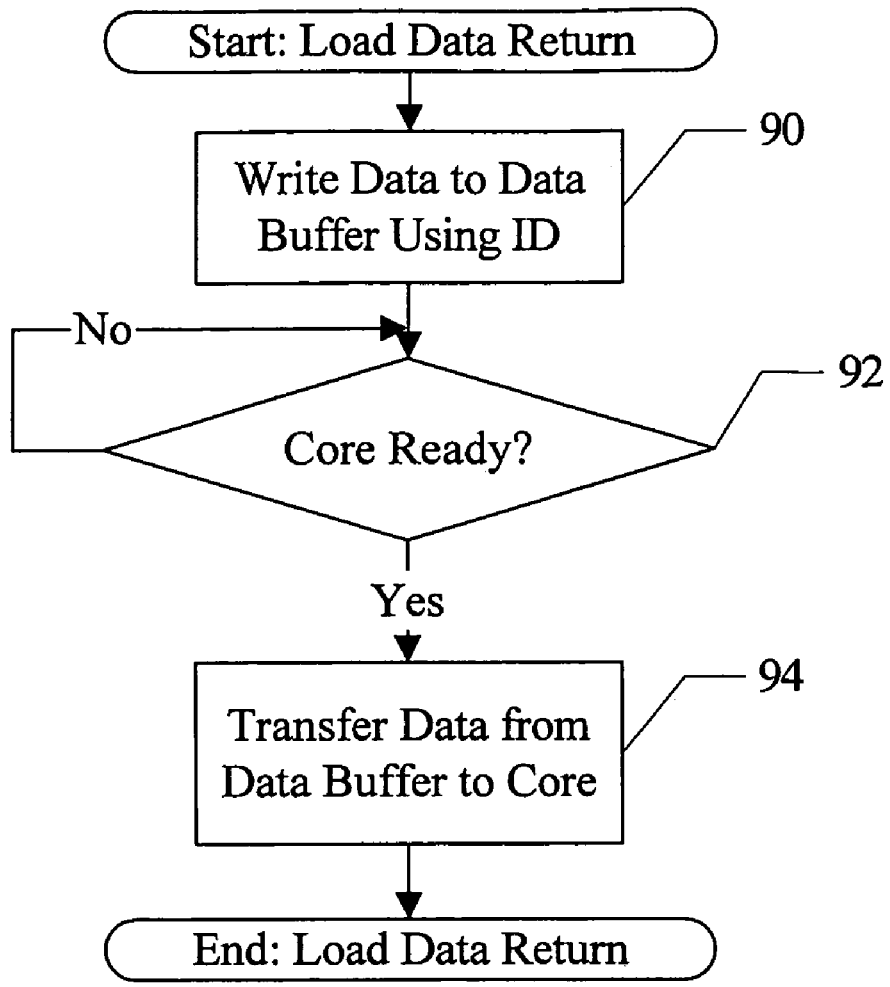
FIG. 5 is a flowchart illustrating operation of one embodiment of the interface unit in response load data being returned from the interconnect.

FIG. 5 is a flowchart illustrating operation of one embodiment of the interface unit 24 for load data returning from the interconnect 20.

The data buffer 28 may receive the transaction ID transmitted in the data phase on the interconnect 20 and may use the portion of the transaction ID that identifies the data buffer entry as a write index to the data buffer 28. The data buffer 28 may write the data into the identified data buffer entry (block 90). In the present embodiment, supplying the cache block for a load miss may also be the trigger to cause a writeback of the evicted cache block, if any. The control unit 40 may reuse the entry storing the load miss cache block for the write back request. The control unit 40 may wait for the core to be ready for the data (decision block 92). For example, in one embodiment, a hole in the load/store pipeline that accesses the data cache 32 may be required to write cache block into the data cache 32. When such a hole is provided, the fill of the cache block into the data cache 32 may be scheduled. The evict may also be scheduled, pipelined with the fill in the data cache 32. For example, in one embodiment, the evict may be scheduled one clock cycle prior to the fill into the data cache 32. The data cache pipeline may be two or more clock cycles (e.g. 4) in one embodiment. Accordingly the evict may read the writeback data from the data cache 32 prior to the fill data being written to the data cache 32, and the fill data may be read from the data buffer 28 prior to the writeback data being written to the same data buffer entry. The control unit 40 may provide the pointer to the data buffer entry as a read index to the data buffer 28, and may transfer data from the data buffer entry to the core 22 (specifically, to the data cache 32) (block 94). The control unit 40 may also transmit the index of the allocated writeback entry as the buffer ID to the core 22, which the core 22 may return with the writeback request (described in more detail below with regard to FIG. 10). Once the cache block of data has been transferred to the core 22, the control unit 40 may update the free list 48 to indicate that the buffer entry is free and may update the credits to indicate that a request credit is being returned (e.g. incrementing the request credit count) (block 96).

In some embodiments, in addition to writing the cache block to the data cache 32, the interface unit 24 may provide information to permit forwarding of data to loads that are awaiting the cache block. For example, as mentioned above, four data transfers may be used on the interconnect 20 to transfer a cache block to the processor 12A. For each of the four data transfers, the control unit 40 may indicate the buffer ID that is receiving data and may also indicate which of the four data transfers are occurring. The oldest load awaiting data from that data transfer may have its data forwarded to the destination.

Figure 6:
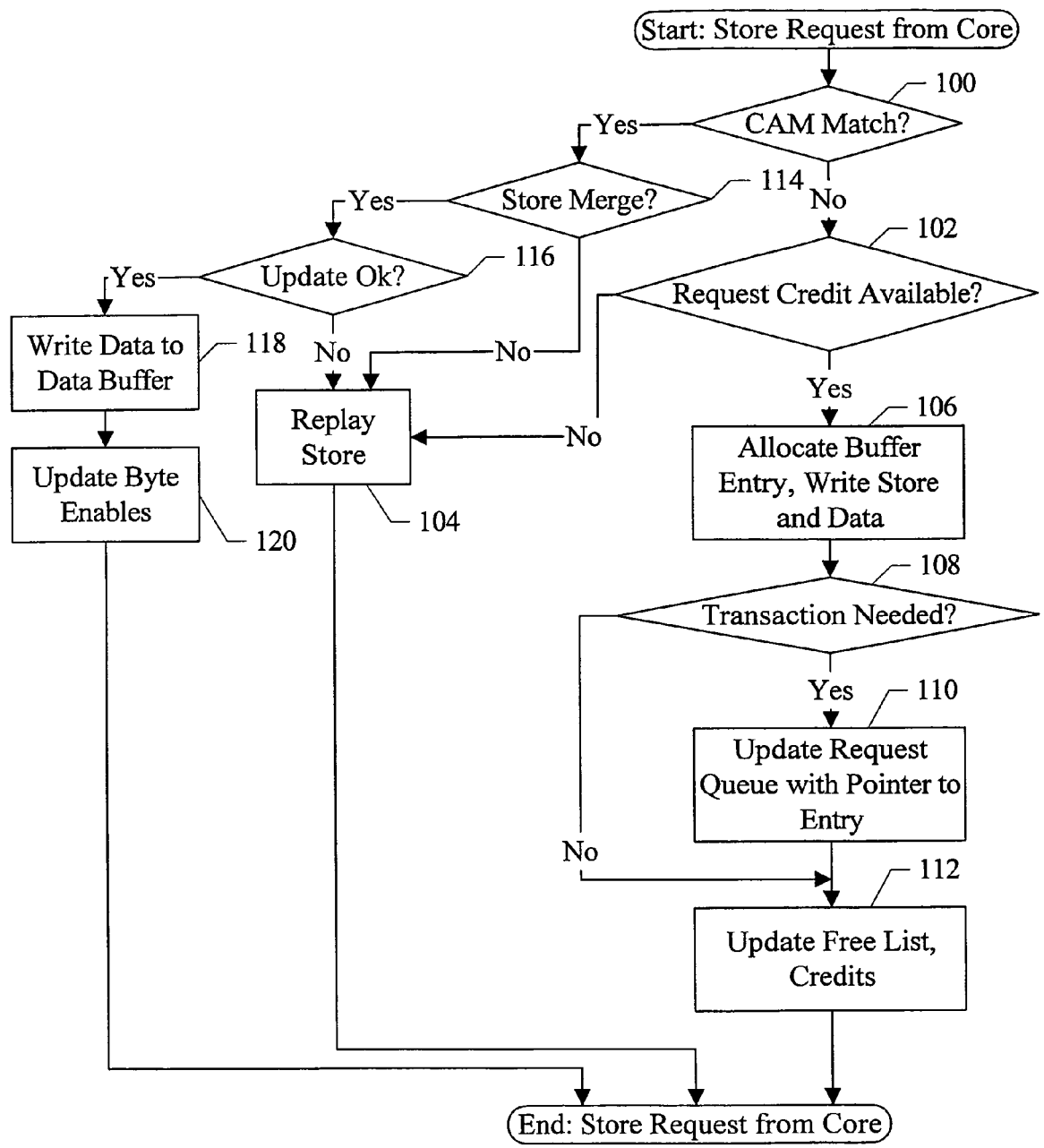
FIG. 6 is a flowchart illustrating operation of one embodiment of the interface unit in response a store request issued by the processor core.

FIG. 6 illustrates operation of one embodiment of the interface unit 24 for a store request from the core 22. In one embodiment, all store requests (cacheable cache hit, cacheable cache miss, non-cacheable) are presented to the interface unit 24. Even in the cacheable cache hit case, store merging may be performed in the address buffer 26 and data buffer 28.

The store address is compared to the address buffer 26. If no match is detected (decision block 100, "no" leg), the control unit 40 may check if a request credit is available in the credits 46. If no request credit is available, the control unit 40 may assert replay for the store request (block 104). If a request credit is available, the control unit 40 may allocate a buffer entry from the free list 48, and may write the store into the allocated address buffer entry and the store data into the allocated data buffer entry using the pointer to the allocated entry as the write index in the address buffer 26 and the data buffer 28 (block 106). In the case of a cacheable cache hit (in a cache state that permits the store update), the store data may comprise the cache block of data, with the store data merged into the cache block. For cacheable cache misses, cacheable cache hits in a cache state that does not permit the store update, or non-cacheable stores, the store data may be only the data written by the store request. The byte enables in the data buffer entry may also be initialized.

For a cacheable cache hit in a state that permits the store update, no transaction on the interconnect 20 is required. In such cases, (decision block 108, "no" leg), the control unit 40 may not update the request queue 44A with the pointer to the buffer entry allocated to the store request. If a transaction is to be performed (decision block 108, "yes" leg), the control unit 40 may update the request queue 44A with a pointer to the allocated buffer entry (block 110). The transaction may be a fill, or a transaction to acquire the appropriate ownership for the cache block, for example. The request may be performed on the interconnect 20 similar to the flowchart of FIG. 4. In either case, the control unit 40 may update the free list 48 to indicate that the buffer is not available and may update the request credit to indicate consumption of the credit (e.g. decrementing the request credit count).

If there is a match of the store address in the address buffer 26 (decision block 100, "yes" leg), and the match is on a buffer entry that is not being used for a store merge (decision block 114, "no" leg), the control unit 40 may assert replay for the store request (block 104). If the match is not on a buffer entry being used for a store merge, the match may be, e.g., on a load request, a snoop request, or a writeback request. A buffer entry being used for a store merge is referred to below as a merge buffer.

If the match is on merge buffer, the control unit 40 may determine if the merge of the store request into the merge buffer is permitted (decision block 116). There may be a variety of reasons why a store request is not permitted to be merged into the merge buffer. For example, the merge buffer may be "closed" to be written to the data cache 32, or via a transaction on the interconnect 20, to memory or an I/O device. Additional details regarding the closing of a merge buffer are provided below with respect to FIG. 7. Additionally, in some embodiments, a store request that overwrites a byte updated by a previously merged store request may not be permitted. Alternatively, whether or not the overwrite is permitted may be programmable in the interface unit 24. If the update is not permitted (decision block 116, "no" leg), the control unit 40 may assert replay for the store request (block 104). If the update is permitted (decision block 116, "yes" leg), the interface unit 24 may write the store data to the merge buffer (block 118) and may update the byte enables to reflect the store request (block 120). The control unit 40 may provide the pointer to the entry hit by the store (generated from the comparison results) to the data buffer 28 as a write index.

Figure 7:
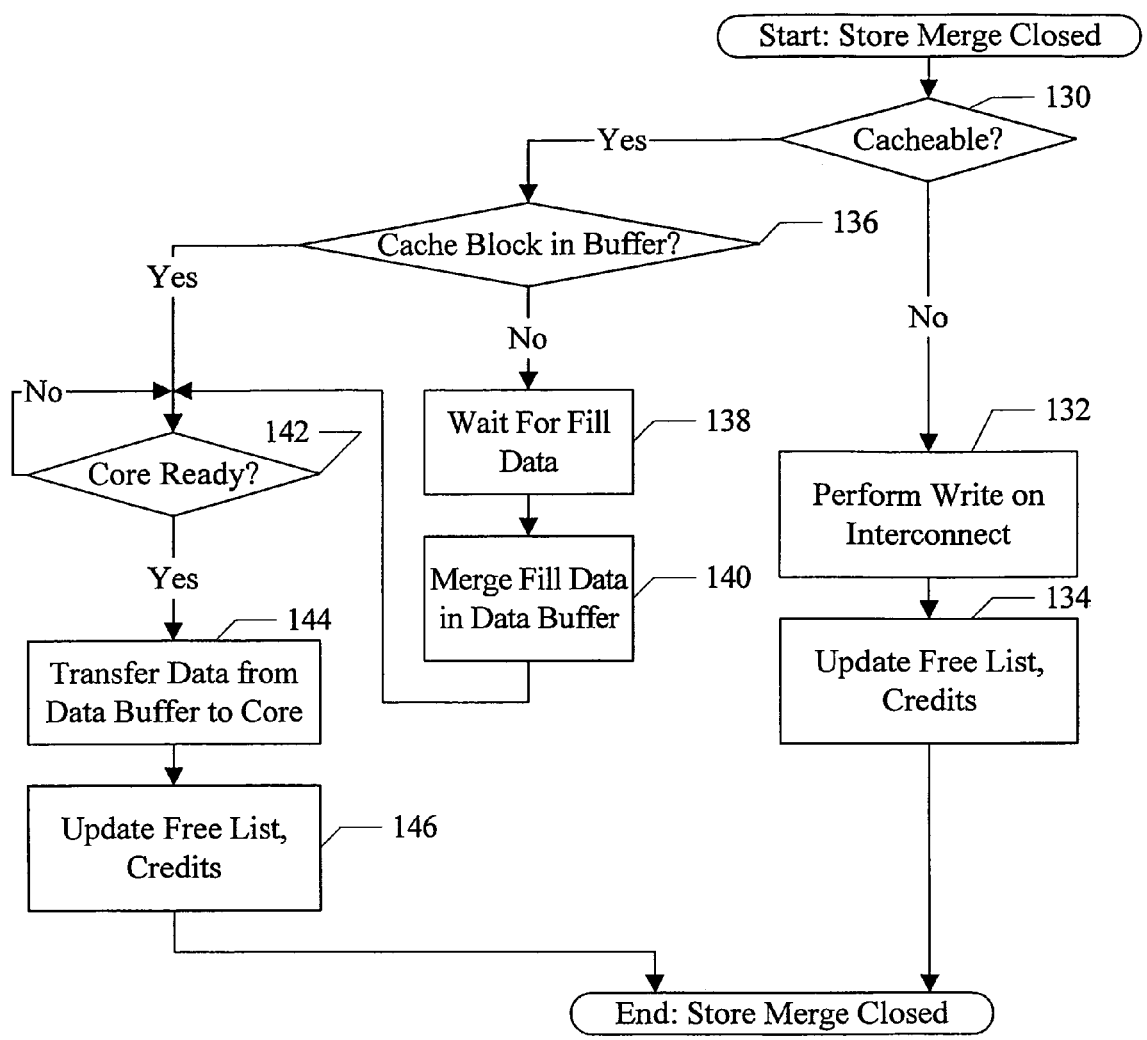
FIG. 7 is a flowchart illustrating operation of one embodiment of the interface unit in response to detecting that a store merge is being closed.

FIG. 7 is a flowchart illustrating operation of one embodiment of the interface unit 24 when a store merge buffer is closed. Closing a merge buffer may generally refer to preventing additional updates to the merge buffer and writing the data to either the data cache 32 or, via a transaction on the interconnect 20, to memory or an I/O device. There may be a variety of reasons for closing a merge buffer. For example, the number of address buffer/data buffer entries that may be concurrently used as merge buffers may be limited. If a store request is received that is to allocate a new buffer entry for a merge buffer and the limit has been reached, the store request may be replayed and one of the existing merge buffers may be closed (e.g. the oldest one). In some embodiments, if the limit on merge buffers is near and one of the merge buffers is a cache hit, the cache hit merge buffer may be closed to be written back into the data cache 32. A store merge buffer may be closed if no new store requests have been merged within a timeout period. A store buffer may be closed if no more stores are in a load/store queue within the core 22. In such an embodiment, the core 22 may provide a control signal indicating that there are no additional stores in the load/store queue. The merge buffer may be closed if a snoop request hits on the store merge buffer. If any request is replayed due to a match on the merge buffer, the merge buffer may be closed. As mentioned previously, in one embodiment, a cacheable load request that is a cache hit in the data cache 32 may not cause the merge buffer to close unless the load accesses one or more bytes updated by the merged stores. If the entire cache block has been written via merged store requests, the merge buffer may be closed. One or more of the above reasons to close a merge buffer may be programmably enabled/disabled, in some embodiments.

If the stores merged into the merge buffer are non-cacheable (decision block 130, "no" leg), the control unit 40 may perform the write transaction on the interconnect 20 (block 132). Performing the write transaction on the interconnect 20 may generally include performing the address phase on the interconnect, similar to FIG. 4, and subsequently transferring the data on the interconnect 20 as well. Once the address phase is successfully completed, the request queue 44A may be updated to delete the pointer to the merge buffer entry. Once the write is completed on the interconnect 20, including the data transfer, the control unit 40 may update the free list to indicate that the buffer is available and may update the request credit to indicate that the credit is returned (e.g. incrementing the request credit count) (block 134).

If the stores merged into the merge buffer are cacheable (decision block 130, "yes" leg), and the cache block is not yet in the data buffer 28 (decision block 136, "no" leg), the control unit 40 may wait for the fill data to arrive from the interconnect 20 (block 138). The arriving fill data is merged into the data buffer entry using the byte enables to identify bytes that have been updated by the merged stores (block 140). Once the cache block is in the data buffer, the write to the data cache 32 may be scheduled in the core 22. When the core is ready (decision block 142, "yes" leg), the control unit 40 may transfer the data from the data buffer entry to the core 22, using the pointer to the entry as a read index to the data buffer 28 (block 144). Additionally, the control unit 40 may update the free list 48 and the request credit to reflect freeing of the buffer (block 146).

Figure 8:
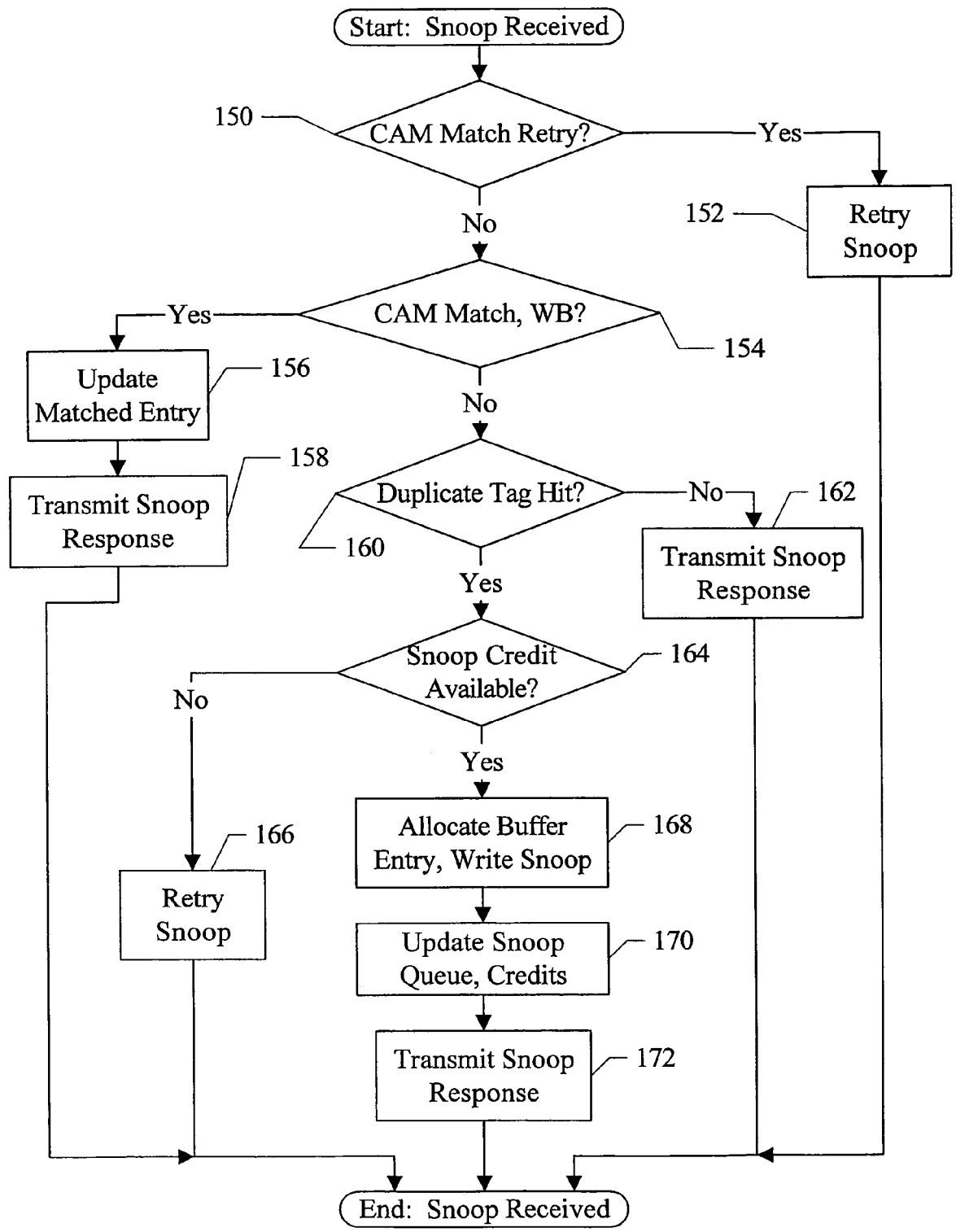
FIG. 8 is a flowchart illustrating operation of one embodiment of the interface unit in response to receiving a snoop request from the interconnect.

FIG. 8 is a flowchart illustrating operation of one embodiment of interface unit 24 responsive to receiving a snoop request from the interconnect 20. The snoop address is compared to the address buffer entries 26 that do not store snoop requests. If the result of the comparison is a match that causes a retry (decision block 150, "yes" leg), the control unit 40 may assert a retry response during the response phase of the snoop request (block 152). Matches that cause a retry may include requests that have been ordered via successful transmission of the address phase of the corresponding transaction, for example. If there is a match on a writeback request that has not yet been ordered (decision block 154, "yes" leg), the control unit 40 may update the matched buffer entry to indicate the snoop hit and may queue the pointer to the matched buffer entry in the snoop queue 44B (and delete the pointer from the writeback queue) (block 156). The writeback may be completed as a data transfer in response to the snoop request for this case. The control unit 40 may also transmit a snoop response in the response phase of the snoop request (block 158).

If there is no retry due to an address match in the address buffer and no update of an address buffer entry that is matched by the snoop request, the result of the look up in the duplicate cache tags 42 is used. If there is no duplicate cache tags hit for the snoop request, or a duplicate cache tag hit occurs that does not require additional action in the processor 12A (decision block 160, "no" leg), the control unit 40 may transmit the snoop response in the response phase of the snoop request (block 162). If there is a duplicate cache tags hit that requires additional action, (decision block 160, "yes" leg), the control unit 40 may determine if there is a snoop credit available in the credits 46. If there is no snoop credit available (decision block 164, "no" leg), the control unit 40 may assert a retry response during the response phase of the snoop request (block 166). If there is a snoop credit available (decision block 164, "yes" leg), the control unit 40 may allocate an address buffer entry from the free list 48 for the snoop request and may write the snoop request into the allocated address buffer entry using the pointer to the allocated entry as a write index to the address buffer 26 (block 168). The control unit 40 may update the free list 48 to indicate that the buffer entry is allocated. The control unit 40 may also update the snoop queue 44B with the pointer to the allocated buffer entry, and update the snoop credit to indicate that a credit has been consumed (e.g. decrementing the credit) (block 170). During the response phase of the snoop request on the interconnect 20, the control unit 40 may transmit the snoop response (block 172).

Figure 9:
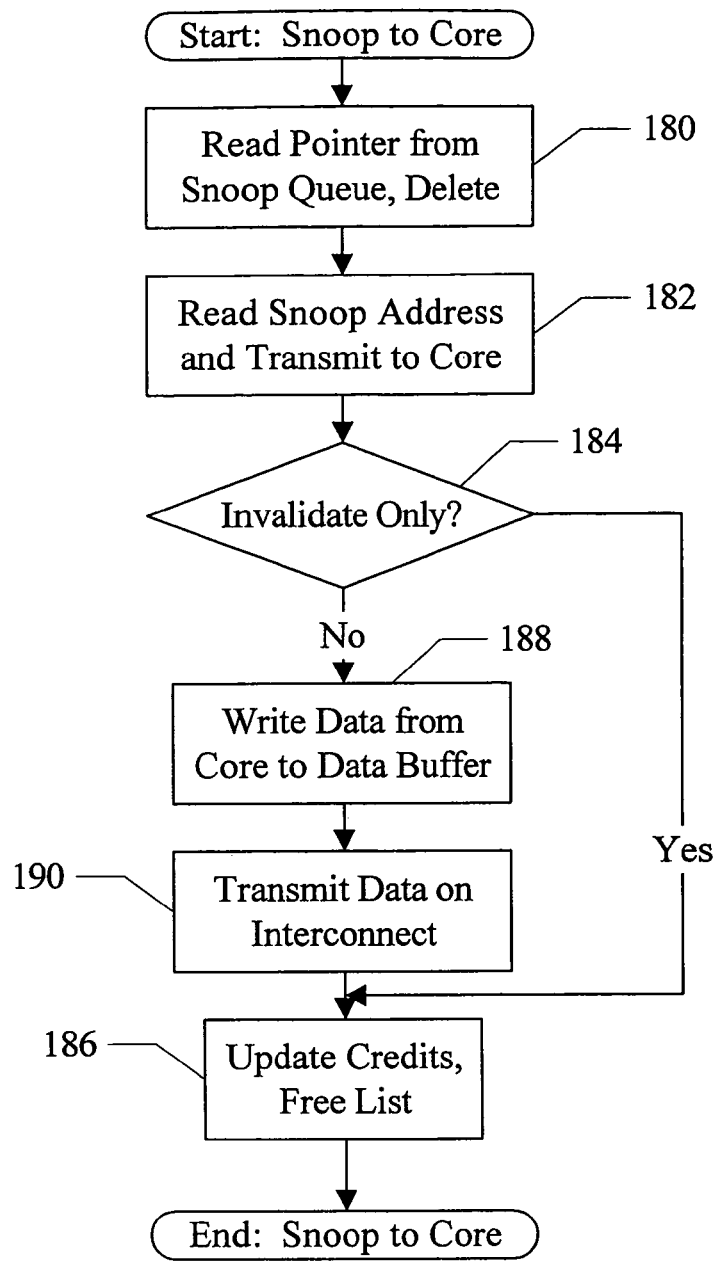
FIG. 9 is a flowchart illustrating operation of one embodiment of the interface unit to transmit a received snoop request to the processor core.

If one or more snoop requests are indicated in the snoop queue 44B, the control unit 40 may arbitrate for access to the data cache 32 with fills (from the data buffer 28) and load/store accesses generated by the core 22. FIG. 9 illustrates operation of one embodiment of the interface unit 24 in response to a snoop request being granted access to the data cache 32.

The control unit 40 may read the pointer from the snoop queue 44B (block 180) and delete the pointer from the snoop queue 44B. The control unit 40 may use the pointer as a read index into the address buffer 26, and may read the snoop address from the identified address buffer entry for transmission as the snoop address to the core 22 (block 182). If the snoop request is to invalidate the cache block without transmitting the cache block on the interconnect 20 (decision block 184, "yes" leg), the control unit 40 may update the free list 48 to indicate that the buffer entry is available and may update the snoop credit to indicate a return of the credit (e.g. incrementing the snoop credit count) (block 186). If the snoop request also includes transmitting the cache block (decision block 184, "no" leg), the control unit 40 may write the data supplied by the core 22 to the data buffer entry reserved for snoops (block 188) and may transmit the data on the interconnect 20 (block 190) prior to updating the free list 48 and the snoop credit (block 186). Transmitting the data on the interconnect may include arbitrating for a data phase on the interconnect 20 and transmitting the data.

Figure 10:
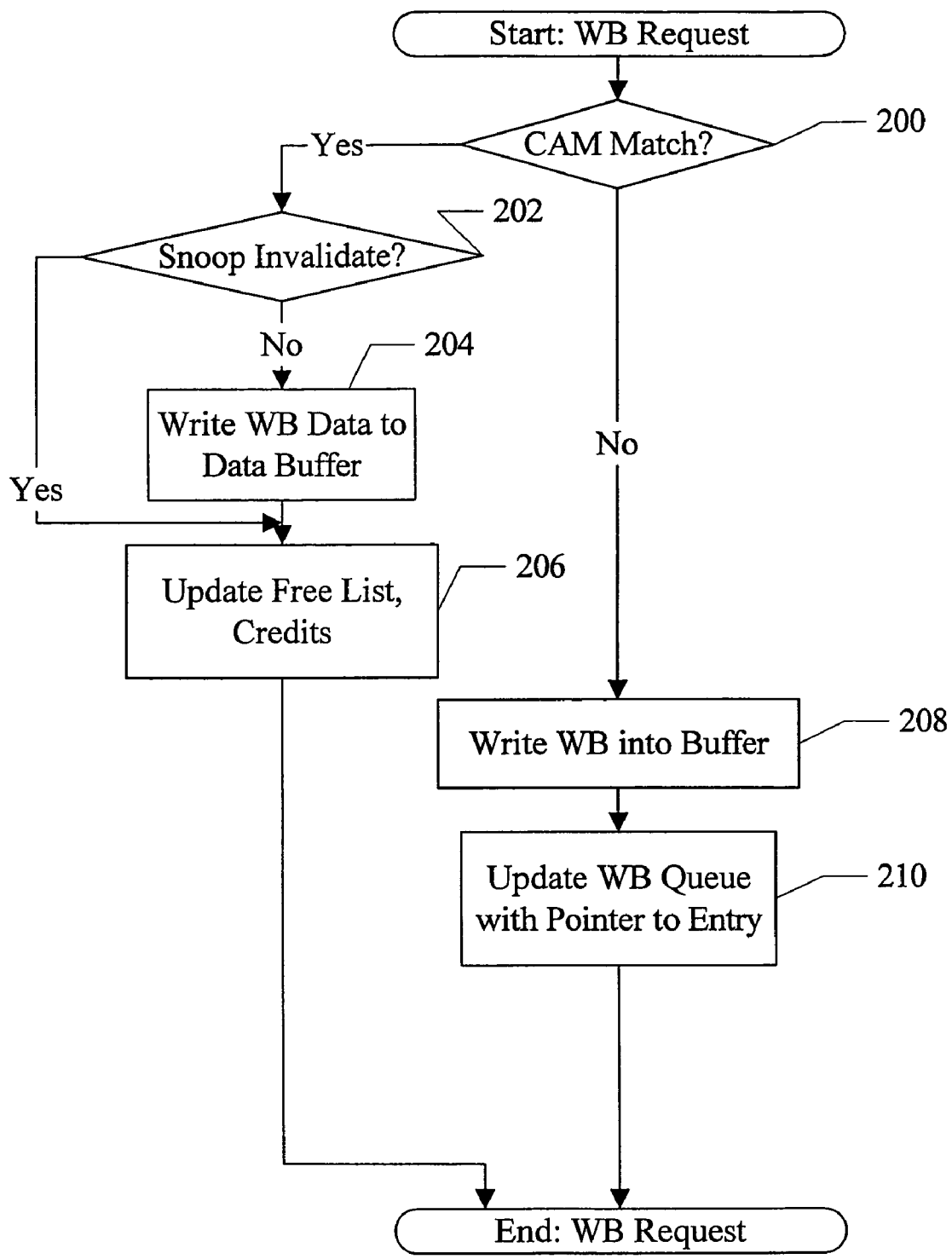
FIG. 10 is a flowchart illustrating operation of one embodiment of the interface unit in response to a writeback request.

FIG. 10 illustrates operation of one embodiment of the interface unit 24 in response to a writeback request from the core 22. As mentioned previously, a writeback request may be generated in response to a cache block transferred into the data cache 32 (as a result of a load miss). If no writeback is generated in response to the fill, the free list 48 and the request credits may be updated to free the buffer entry used for the load miss/cache fill, and which would have been used for the writeback request.

The address of the writeback request may be compared to the address buffer entries. If an address match is detected (decision block 200, "yes" leg), the address match may be against a snoop request or a store merge buffer. If the address match is on a snoop request that will invalidate the cache block without transmission on the interconnect 20 (decision block 202, "yes" leg), the control unit 40 may drop the writeback request. The control unit 40 may update the free list 48 to indicate that the previously allocated buffer entry is free and the request credits to indicate the return of the credit (block 206). If the address match is on another type of snoop request or on a store merge buffer (decision block 202, "no" leg), the control unit 40 may merge the writeback data into the data buffer entry of the snoop request or merge buffer (block 204). Additionally, the control unit 40 may update the free list 48 and the request credits to free the previously allocated buffer entry.

If an address match is not detected (decision block 200, "no" leg), the control unit 40 may write the writeback request to the previously allocated buffer entry, using the pointer to the entry as a write index to the address buffer 26 and the data buffer 28 (block 208). Additionally, the control unit 40 may update the writeback queue 44C with the pointer to the entry (block 210).

The writeback request may be transmitted on the interconnect similar to the operation of FIG. 4. However, in some embodiments, the response phase may indicate that the writeback has been cancelled (e.g. if it is stale in view of a subsequent snoop request). In such embodiments, the data transfer for the writeback request may be cancelled. The free list 48 may be updated to indicate that the buffer entry storing the writeback request is free, and the request credit may be updated to indicate a return of the credit corresponding to the request that caused the writeback request.

Figure 11:
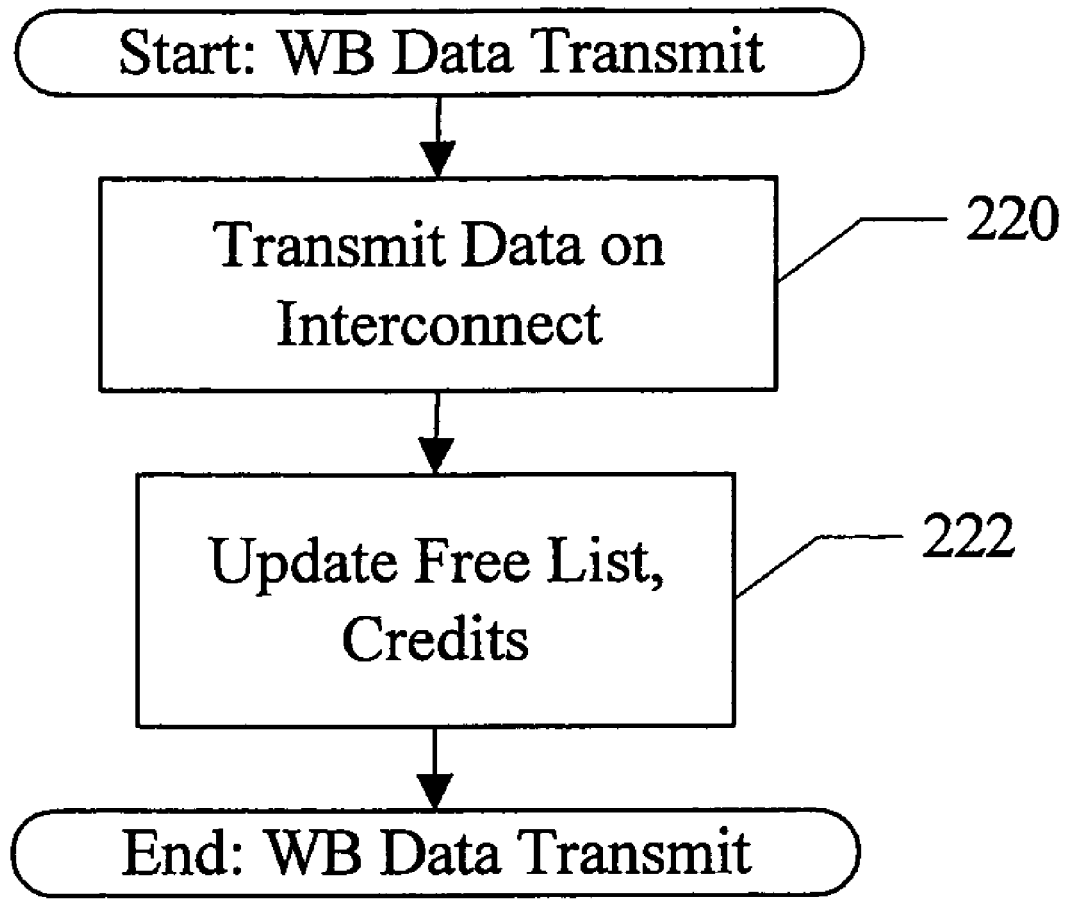
FIG. 11 is a flowchart illustrating operation of one embodiment of the interface unit to transmit writeback data on the interconnect.

If the data transfer is not cancelled, the control unit 40 may arbitrate for the data phase of the writeback request. FIG. 11 is a flowchart illustrating operation of one embodiment of the interface unit 24 for transmitting the writeback data. The control unit 40 may read the writeback data from the data buffer entry (using the pointer to the entry as a read index to the data buffer 28) and transmit the data on the interconnect 20 (block 220). Additionally, the control unit 40 may update the free list 48 to indicate that the buffer entry storing the writeback request is free, and the writeback credit may be updated to indicate a return of the credit (block 222).

Numerous variations and modifications will become apparent to those skilled in the art once the above disclosure is fully appreciated. It is intended that the following claims be interpreted to embrace all such variations and modifications.

What is claimed is:

1. An interface unit configured to interface a processor core to an interconnect, the interface unit comprising:
   an address buffer comprising a plurality of address buffer entries, the address buffer is configured to store addresses of processor core requests generated by the processor core and addresses of snoop requests received from the interconnect;
   a control unit coupled to the address buffer, the control unit configured to maintain a plurality of queues, with at least a first queue of the plurality of queues dedicated to snoop requests and at least a second queue of the plurality of queues is dedicated to processor core requests;
   the control unit is further configured to respond to a first snoop request received by the interface unit from the interconnect, to allocate a first address buffer entry of the plurality of address buffer entries to store the first snoop request, and the control unit stores a first pointer to the first address buffer entry in the first queue;
   the control unit is responsive to a first processor core request received by the interface unit from the processor core and to allocate a second address buffer entry of the plurality of address buffer entries to store the first processor core request, and the control unit is configured to store a second pointer to the second address buffer entry in the second queue; and,
   the control unit reads the first pointer from the first queue to use as an index to the address buffer to read or write the first address buffer entry, and the control unit reads the second pointer from the second queue to use as an index to the address buffer to read or write the second address buffer entry.

2. The interface unit as recited in claim 1 wherein the plurality of queues further comprises a writeback queue dedicated to writeback requests from the processor core, wherein the control unit is configured to store a third pointer to a third address buffer entry that is storing the writeback request into the writeback queue.

3. The interface unit as recited in claim 1 wherein the control unit is configured to maintain a free list indicating address buffer entries that are not storing requests, and wherein the control unit is configured to select the first address buffer entry from the free list to allocate the first address buffer entry to the first snoop request, and wherein the control unit is configured to select the second address buffer entry from the free list to allocate the second address buffer entry to the first snoop request.

4. The interface unit as recited in claim 3 wherein the control unit, responsive to a completion of the first snoop request, is configured to add an indication of the first address buffer entry to the free list, and wherein the control unit, responsive to a completion of the first processor core request, is configured to add an indication of the second address buffer entry to the free list.

5. The interface unit as recited in claim 1 further comprising a duplicate cache tags configured to store a set of cache tags and corresponding cache states for cache blocks stored in the processor core, and wherein the interface unit is configured to look up the first snoop request in the duplicate cache tags prior to allocating the first address buffer entry, and wherein the interface unit is configured to inhibit allocating the first address buffer entry if the processor core has no action to take for the first snoop request.

6. The interface unit as recited in claim 1 further comprising a data buffer including a plurality of data buffer entries, wherein each data buffer entry is associated with a different address buffer entry of the plurality of address buffer entries, and wherein each data buffer entry is identified using the same pointer that identifies the associated address buffer entry, and wherein each data buffer entry is configured to store data corresponding to the request stored in the associated address buffer entry.

7. The interface unit as recited in claim 6 wherein a number of the plurality of address buffer entries exceeds a number of the plurality of data buffer entries.

8. The interface unit as recited in claim 7 wherein address buffer entries having no associated data buffer entry are dedicated to storing snoop requests.

9. The interface unit as recited in claim 7 wherein the control unit, responsive to a first store request from the processor core, is configured to allocate a third address buffer entry and associated data buffer entry to the first store request, and wherein the third address buffer entry is configured to store the first store request and the associated data buffer entry is configured to store first store data corresponding to the first store request.

10. The interface unit as recited in claim 9 wherein the control unit, responsive to one or more additional store requests that update data within a same cache block as the first store request, is configured to merge store data corresponding to the additional store requests into the associated data buffer.

11. The interface unit as recited in claim 10 wherein the control unit is configured to cause the processor core to write the cache block included the merged stored data into a data cache in the processor core.

12. The interface unit as recited in claim 10 wherein the control unit is configured to cause the merged store data to be written to a destination via the interconnect.

13. A method comprising:
maintaining a plurality of queues, wherein at least a first queue of the plurality of queues is dedicated to snoop requests and at least a second queue of the plurality of queues is dedicated to processor core requests;
responsive to a first snoop request received from an interconnect, allocating a first address buffer entry of a plurality of address buffer entries comprised in an address buffer;
storing a first pointer to the first address buffer entry in the first queue;
responsive to a first processor core request received from a processor core, allocating a second address buffer entry of the plurality of address buffer entries to store the first processor core request;
storing a second pointer to the second address buffer entry in the second queue; and,
reading the first pointer from the first queue to use as an index to the address buffer to read or write the first address buffer entry; and
reading the second pointer from the second queue to use as an index to the address buffer to read or write the second address buffer entry.

14. The method as recited in claim 13 further comprising:
storing a set of cache tags and corresponding cache states for cache blocks stored in the processor core in a duplicate cache tags;
looking up a second snoop request in the duplicate cache tags; and
inhibit allocating one of the plurality of address buffer entries to the second snoop request if the processor core has no action to take for the first snoop request.

15. The method as recited in claim 13 further comprising:
responsive to a first store request from the processor core, allocating a third address buffer entry and an associated data buffer entry to the first store request;
storing the first store request in the third address buffer entry;
storing first store data corresponding to the first store request in the associated data buffer entry; and
responsive to one or more additional store requests that update data within a same cache block as the first store request, merging store data corresponding to the additional store requests into the associated data buffer.

16. The method as recited in claim 15 further comprising writing the cache block included the merged stored data into a data cache in the processor core.

17. The method as recited in claim 15 further comprising writing the merged store data to a destination via the interconnect.

* * * * *